2 Sheets—Sheet 1.

I. NIEUKIRK.
Churn.

No. 227,045. Patented April 27, 1880.

WITNESSES
Robert Everett
Chas. J. Page

INVENTOR
Isaiah Nieukirk
Gilmore, Smith & Co,
ATTORNEYS

2 Sheets—Sheet 2.

I. NIEUKIRK.
Churn.

No. 227,045. Patented April 27, 1880.

WITNESSES
Robert Lorrett
Chas. G. Page.

INVENTOR
Isaiah Nieukirk
Gilmore Smith & Co.
ATTORNEYS

UNITED STATES PATENT OFFICE.

ISAIAH NIEUKIRK, OF BRIGHTON, IOWA.

CHURN.

SPECIFICATION forming part of Letters Patent No. 227,045, dated April 27, 1880.

Application filed November 22, 1879.

*To all whom it may concern:*

Be it known that I, ISAIAH NIEUKIRK, of Brighton, in the county of Washington and State of Iowa, have invented certain new and useful Improvements in Churns; and I do hereby declare that the following is a full, clear, and exact description of the construction and operation of the same, reference being had to the annexed drawings, making a part of this specification, and to the letters and figures of reference marked thereon.

Figure 1:
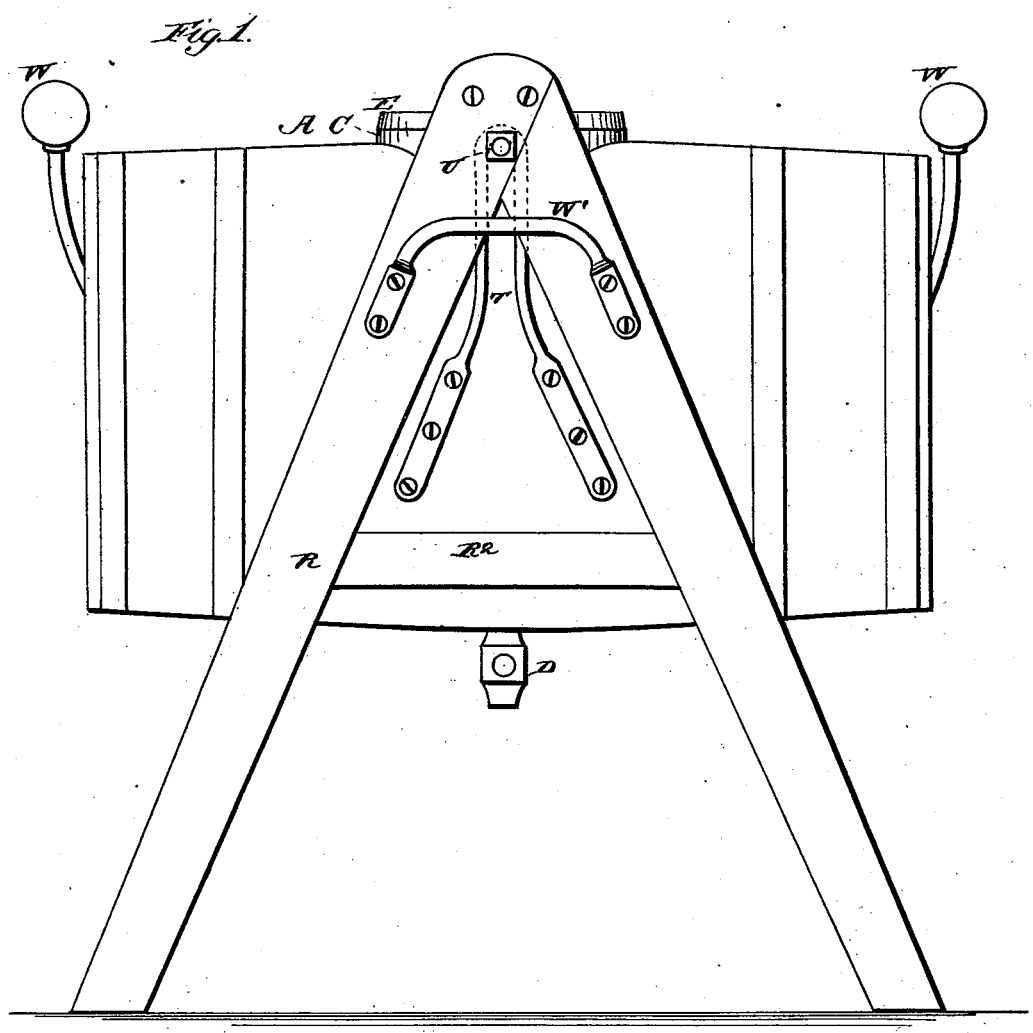
Figure 2:
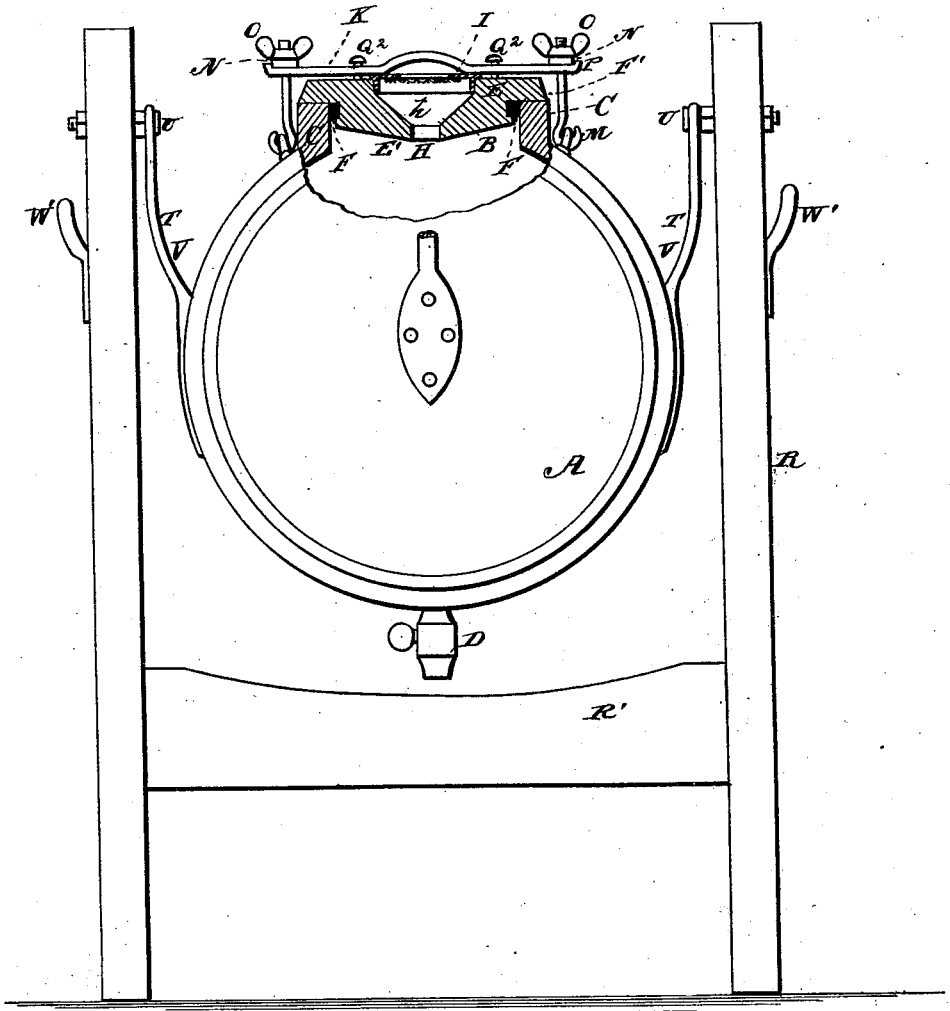
Figure 3:
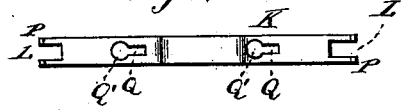

Figure 1 of the drawings is a representation of a side elevation of my churn. Fig. 2 is a vertical sectional view; and Fig. 3 is a detail view.

The nature of my present invention relates to an improved churn constructed so that the churning may be effected by tilting, swaying, or swinging the vessel containing the milk or cream.

My improvement relates to the construction and combination of a bung or cap for the churn-body, with a collar surrounding the bung-hole, and means for securing the bung or cap in place; also, to the construction and arrangement of certain parts of the churn, all as fully set forth in the following description, and particularly pointed out in the claims.

In the annexed drawings, A designates the churn-body, which may be made in the form of a barrel or cask, or in other shape suitable for churning the milk or cream by tilting or swinging the churn-body upon pivotal side bearings. In the upper side of the body A is formed a large bung-hole, B, through which the milk or cream will be poured into the vessel, and the butter taken out after the churning has been completed. In the under side of the said churn-body is formed a small hole, into which is fitted a stop-cock, D, or an ordinary plug, so that when desired the butter-milk or water with which the churn is washed may be drawn off.

The bung-hole B is surrounded by a collar or molding, C, formed integral with the upper side of the body A, the inner side of said collar or molding being made to correspond with the area of the bung-hole, which may be made either round or square, as desired.

The bung or cap E is formed with a groove, into which is arranged an elastic packing-strip, F, so as to form a tight joint between the cap and the collar around the bung-hole. The bung is also formed with a flange, F', which fits upon the top of the collar or molding C, and it is also made with an extended or inverted cone-shaped portion, E', upon its under side.

Through the center of the bung is a hole, H, having an enlargement, $h$, at its upper end, which is covered by a cap, I. This cap has a central opening, which is somewhat smaller than the area of the enlarged opening $h$, and which is covered by wire-gauze or perforated metal, or both combined, for the purpose of preventing insects from passing into the churn-body. The opening into the churn admits air for the purpose of ventilation, and the enlargement $h$ forms a cup, which collects such cream as may splash up against the cap I, and conducts it back again into the vessel.

The bung and its cap are secured in position upon the churn-body by means of a bar, K, which is arched at about its middle so as to clear the wire-gauze or perforated center of the cap, and at the same time to rest upon the said cap near its edge and upon the upper face of the bung. This bar is also formed with slots L at its ends, which admit the bolts M, on each side of the collar or molding, to engage with the bar, which is held down by means of the nuts N and thumb-screws O. The ends of the bar are turned up, as at P, so as to prevent the nuts from slipping off, and between its ends and the central arch are formed the slots Q, with enlargements Q', for pins $Q^2$ upon the bung. These pins are provided with suitable heads, so that the bar can only be removed when the enlarged portions of its slots Q are coincident with the said heads of the pins. The bolts upon which the thumb-screws work are attached to the churn-body, on each side of its collar or molding C, by means of staples or any suitable or equivalent means.

The pyramidal frame in which the churn-body is supported is mainly composed of the inclined side bars, R, the horizontal side cross-bars, R', and the horizontal end cross-bars, $R^2$. The bars R' are arranged at a sufficient distance above the base of the frame to admit of ready access being had to the plug or stop-cock at the under side of the churn-body, and at the same time not so high up as to allow the legs to spread apart. The end bars, R², are arranged so as not to interfere with the free tilting of the churn-body upon its pivotal bearings.

T T designate yokes or hangers for suspending the churn-body upon the pivots U U, which pass through the apices of the sides of the supporting-frame. These hangers extend downward and spread outward or apart, and are suitably secured to the sides of the churn-body. By spreading these hangers, as above set forth, greater strength will be attained, since the legs of a hanger stand as braces to each other, and such spreading also admits of the churn being raised and entirely freed from the pivots. The hangers are also bent inward or toward the churn, as at V, so as to facilitate the removal of the churn, since by raising the churn vertically the hangers will entirely clear the pivots U.

Upon the ends of the churn-body are handles W, for tilting the same and for raising it from its bearings; and upon the sides of the supporting-frame are handles W', whereby the frame may be conveniently lifted and carried from place to place.

Having thus described my improvement, what I claim, and desire to secure by Letters Patent, is—

1. The churn-body A, with a bung-hole in its upper side and a collar or molding, C, surrounding the same, the flanged bung E, cap I, hole H, and bar K, secured upon the bung and cap by means of set-screws, substantially as shown and set forth.

2. The churn-body A, with a bung-hole, B, and the bung E, formed with a hole, H, having an enlargement, $h$, at its upper end, covered by a cap with a perforated center, substantially as set forth.

3. In combination with the churn-body, bung, and cap I, the bar K, with slotted and turned-up ends, an arched middle portion, and slots Q, the pins Q², bolts M, and thumb-screws, substantially as set forth.

In testimony that I claim the above I have hereunto subscribed my name in the presence of two witnesses.

ISAIAH NIEUKIRK.

Witnesses:
B. E. ISRAEL,
D. J. JEFFERY.